UNITED STATES PATENT OFFICE.

CARLETON ELLIS, OF MONTCLAIR, NEW JERSEY.

CATALYZER FOR HYDROGENATION AND THE PREPARATION THEREOF.

1,426,629.          Specification of Letters Patent.     Patented Aug. 22, 1922.

No Drawing. Application filed December 23, 1913, Serial No. 808,461. Renewed February 13, 1919.
Serial No. 276,869.

*To all whom it may concern:*

Be it known that I, CARLETON ELLIS, citizen of the United States, residing at Montclair, New Jersey, have invented certain new and useful Improvements in Catalyzers for Hydrogenation and the Preparation Thereof, of which the following is the specification.

The present invention relates to the catalyzers for the hydrogenation of oils, and to methods of preparing same.

The catalyzers herein described are characterized in general, by containing sulphur in the form of a sulfate, which may be sulfate of barium or of sodium, or other suitable metal.

It has been heretofore generally considered that with catalyzers such as nickel, (whether in the elemental condition or in the form of an oxid) the presence of even a very small amount of sulfur is highly injurious. I have however discovered that while this is true for many forms of sulfur, it is not true with sulfur in the form of sulfate, which compounds act as accelerators with catalyzers of the nickel type (i. e. metals with an atomic weight of from 56 to 63.6), used in the hydrogenation of unsaturated organic bodies, such as fatty oils containing compounds of an unsaturated nature. The sulfate may be in the form of a soluble sulfate, such as sodium sulfate, or an insoluble sulfate, such as barium sulfate.

As examples of procedure falling within the scope of the present invention, I give the following examples:

Example 1. Solutions of barium hydroxid and nickel sulfate are mixed together in chemically equivalent quantities, there being thereby produced a mixed precipitate which consists essentially of barium sulfate and nickel hydroxid, the two being in a state of very intimate association.

Example 2. Nickel sulfate is mixed with slaked lime and nickel hydroxid is thereby precipitated in intimate association with calcium sulfate. This mixture may (without washing) be dried and ignited in hydrogen. If desired, prior to the drying, a small quantity of a soluble palladium salt may be added, so as to produce a product containing both nickel and palladium, and the mixture reduced by igniting in a current of hydrogen or other suitable reducing gas. In this example one may employ from one to two pounds of calcium oxid, to ten pounds of fully hydrated nickel sulfate ($NiSO_4 7H_2O$), and one ounce of palladium chloride.

Example 3. A suitable catalyzer may be prepared by reacting with nickel fluosilicate upon lime or other suitable base, and reducing as above.

Example 4. A concentrated solution of nickel sulfate is mixed with quick lime or hydrated lime, the resulting material calcined, and carefully reduced with hydrogen. In this example also nickel nitrate may be substituted for sulfate. There is produced by the calcination, nickel oxid which is apparently to some extent in combination with calcium, as a basic compound. This material is then carefully reduced with hydrogen and is ready for use as a catalyzer for the hydrogenation of oil. During the hydrogenation the active lime compound serves to satisfy and neutralize the nascent fatty acid liberated, and thus the nickel is protected from the action of fatty acids. In this example, in place of lime other oxides, hydroxides, carbonates and similar compounds of calcium or magnesium may be employed.

Example 5. The catalyzer is prepared containing as its active ingredients a mixture of nickel (or reduced nickel carbonate) with sodium sulfate. Nickel oxide may likewise be prepared with water-soluble sulfates. The use of water-soluble salts is sometimes an advantage, since (when it is desired to revivify the catalyst) they can be readily washed out, and the nickel recovered and used over.

In the reduction operation of the above examples, a relatively low temperature is preferably employed and the nickel oxid, hydroxid, and the like, is thereby reduced to metal, but the sulfate is left practically all in a non-reduced condition. Sulfur in the elemental condition, as well as sulfur in the form of sulfides, both act as catalyzer poisons, if present in any substantial amount, but when in the form of sulfate it does not possess this deleterious effect, and in some cases seems to act as an accelerator. Extremely minute traces of sulfid sulfur can be present without injuring the catalyst (for use in hydrogenation of oil). The sulfates formed in the above examples are insoluble in oil such as fatty oils, some of the sulfates are soluble in water and some of them are insoluble in water.

The catalyzers produced as above described may be employed for the hydrogenation of oil of a fatty nature containing unsaturated components, either for the production of edible compounds, soap stock or other desired purpose. A convenient apparatus with which to operate the process is that described and claimed in my U. S. Patent 1,247,095.

It will be understood that the employment of catalyzers in an oxidized condition, containing nickel in the form of an oxide is sometimes objectionable for the reason that some of the nickel is likely to be dissolved in the oil during hydrogenation, producing toxic bodies. This action is apparently caused by the reaction between nickel oxide and free fatty acids. Hence it is desirable in the manufacture of edible compounds, to employ catalysts in which the entire amount of nickel is reduced to the metallic condition.

I claim:

1. A process which comprises co-precipitating a nickel compound capable of being converted into a catalyst, and an insoluble sulfate capable of acting as an accelerator.

2. A nickel catalyzer containing other insoluble reaction products produced in the reactions whereby the catalyst is produced, such other reaction products not being inimical to the catalytic activity of the nickel.

3. A process which comprises reacting between an alkali-forming metal hydroxid and nickel sulfate, and thereafter reducing the nickel hydroxid component of the precipitate without completely removing the sulfate radical therefrom.

4. A catalyst comprising a metal with an atomic weight between 56 and 63.6 in intimate association with a sulfate of an alkaline earth metal, such product being free from sulfid in substantial amounts.

5. A catalyzer product containing nickel in intimate association with an alkaline earth metal sulfate, such product being substantially free from sulfid.

6. In the production of a catalyst the improvement which comprises reacting with nickel sulfate on barium hydroxid and thereafter reducing the product.

7. In the production of a catalyzer the steps of reacting with an alkaline earth metal hydroxid on a sulfate of a non-noble metal which metal in the free state is capable of acting as a hydrogen-transferring catalyst, and reducing the product of such reaction without removing all of the alkaline earth metal sulfate therefrom.

8. A catalyzer comprising finely-divided active nickel material thoroughly incorporated with an insoluble sulfate which is incapable of deleteriously affecting such nickel, such product being substantially free from sulfid.

Signed at Montclair, in the county of Essex and State of New Jersey this 16th day of December A. D. 1913.

CARLETON ELLIS.

Witnesses:
B. M. ELLIS,
F. CARBUTT.